Figure 1:
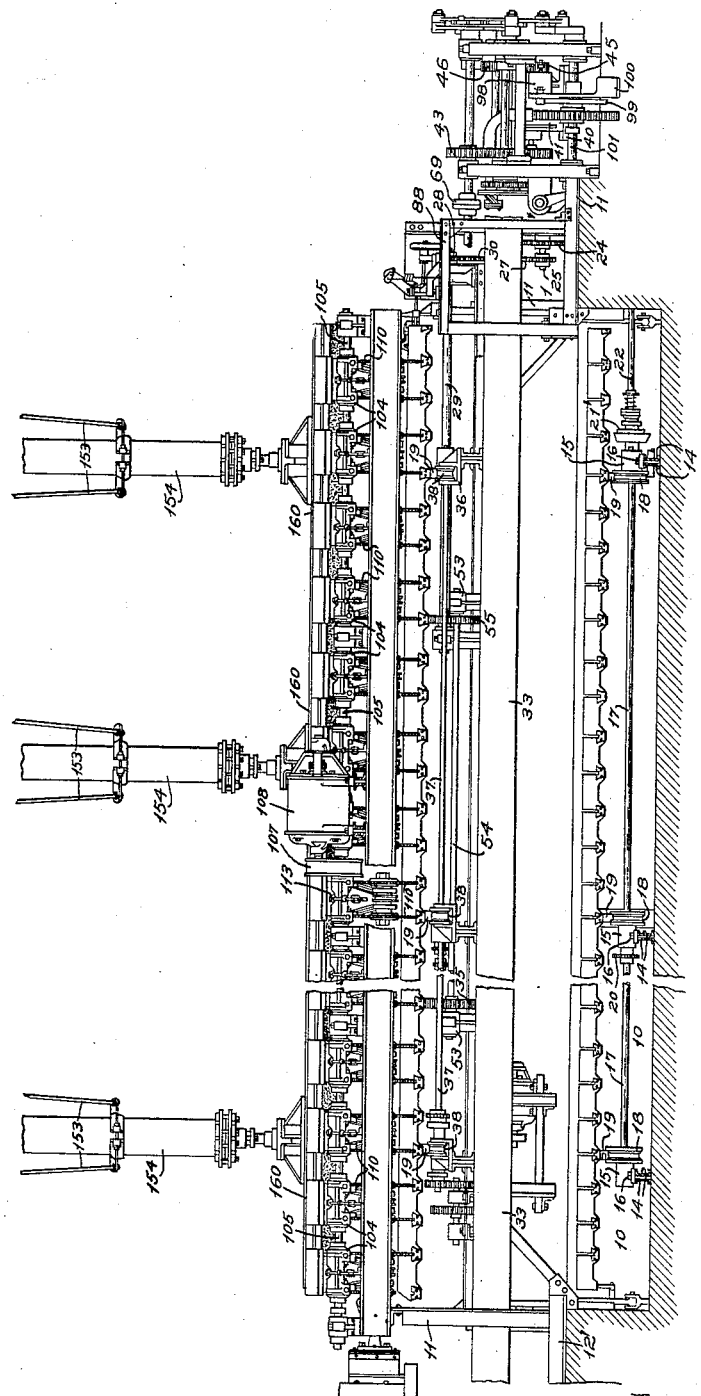

June 2, 1931.  R. C. PENFIELD  1,808,175
LIFTING DEVICE
Original Filed May 5, 1926  7 Sheets-Sheet 1

Inventor
Raymond C. Penfield
by James R. Hodder
Attorney

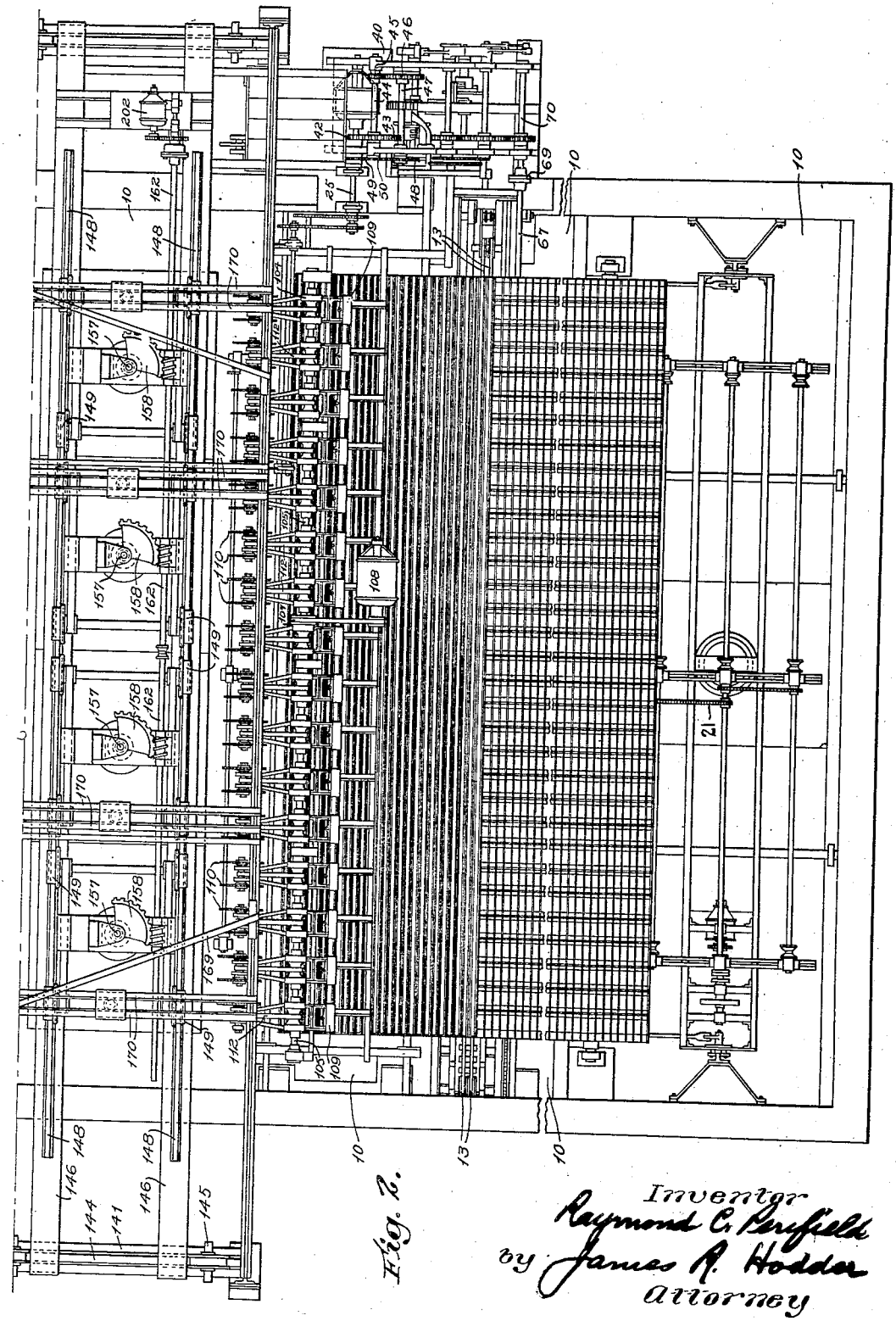

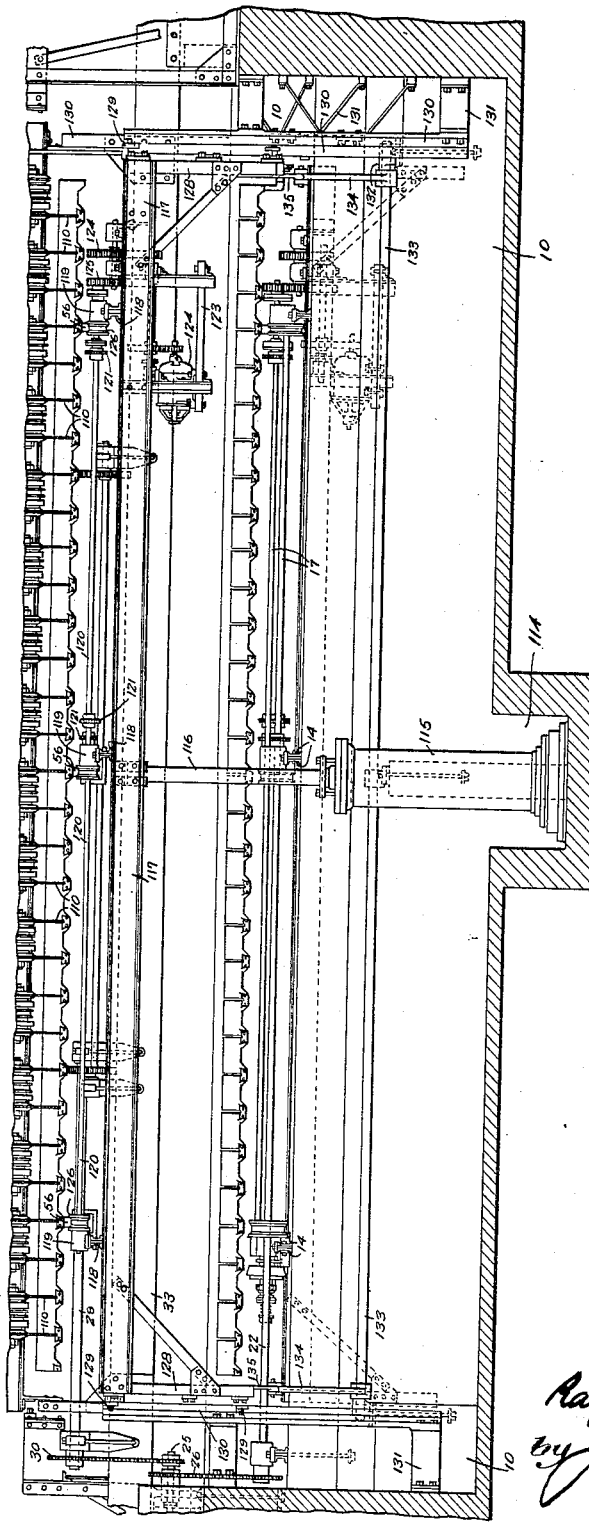

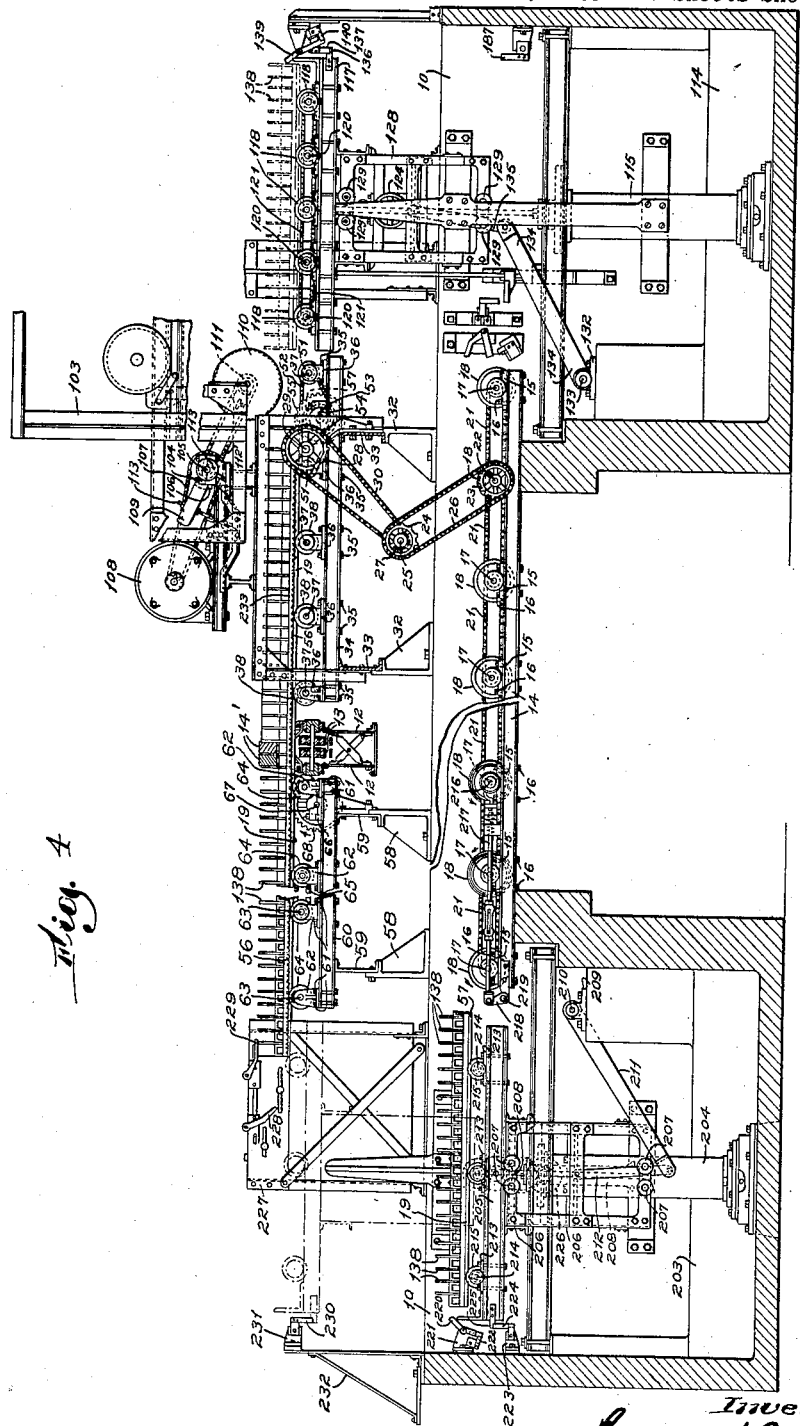

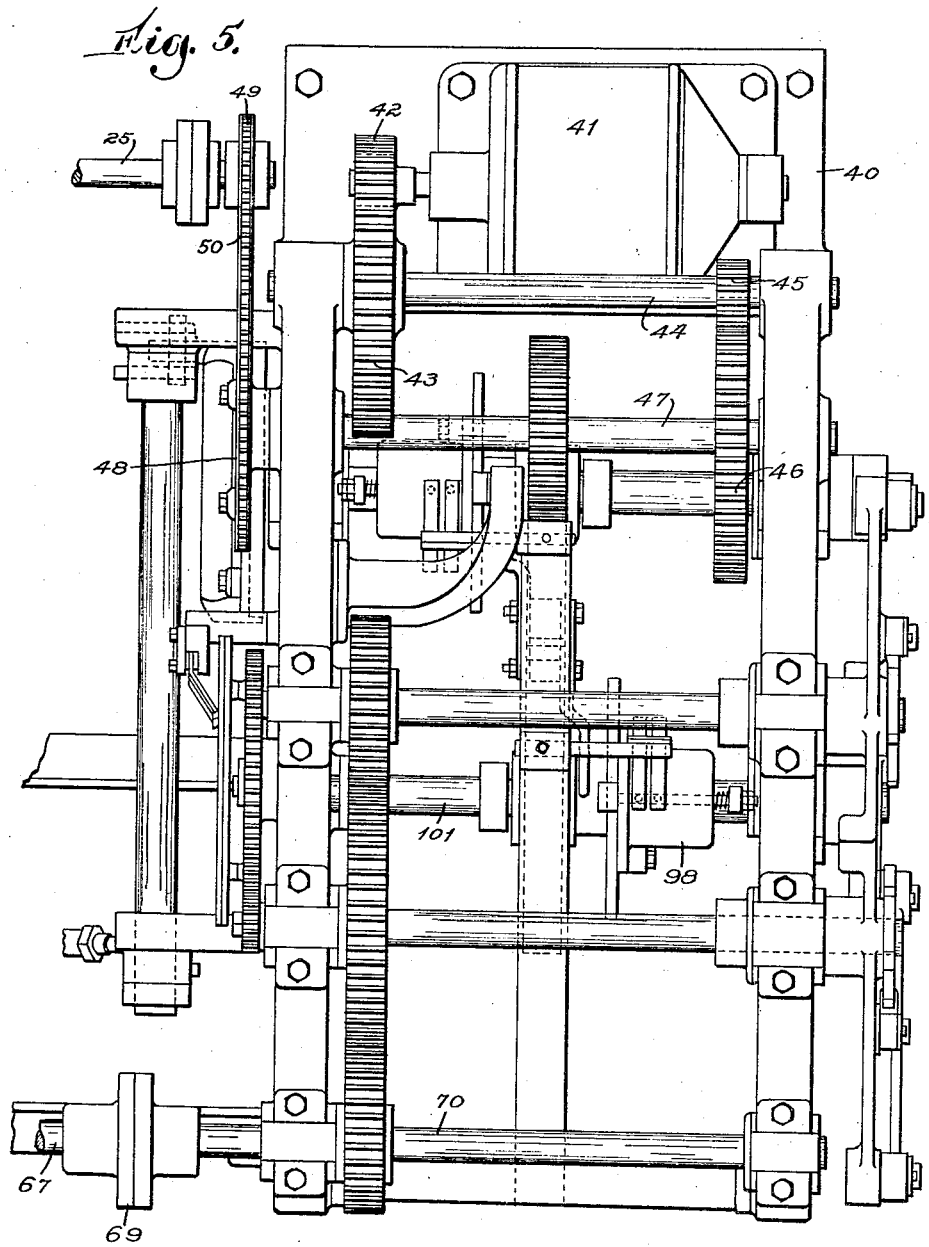

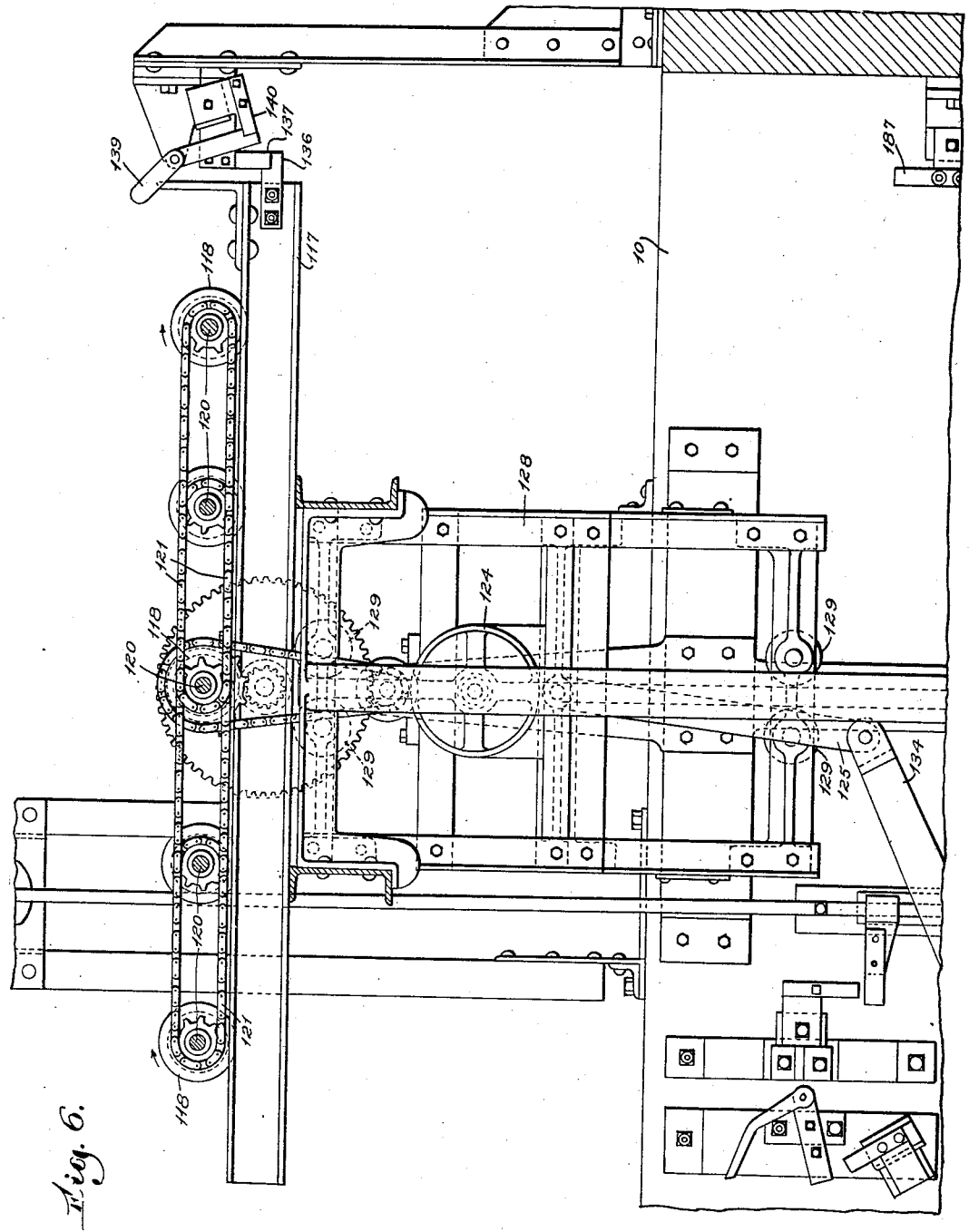

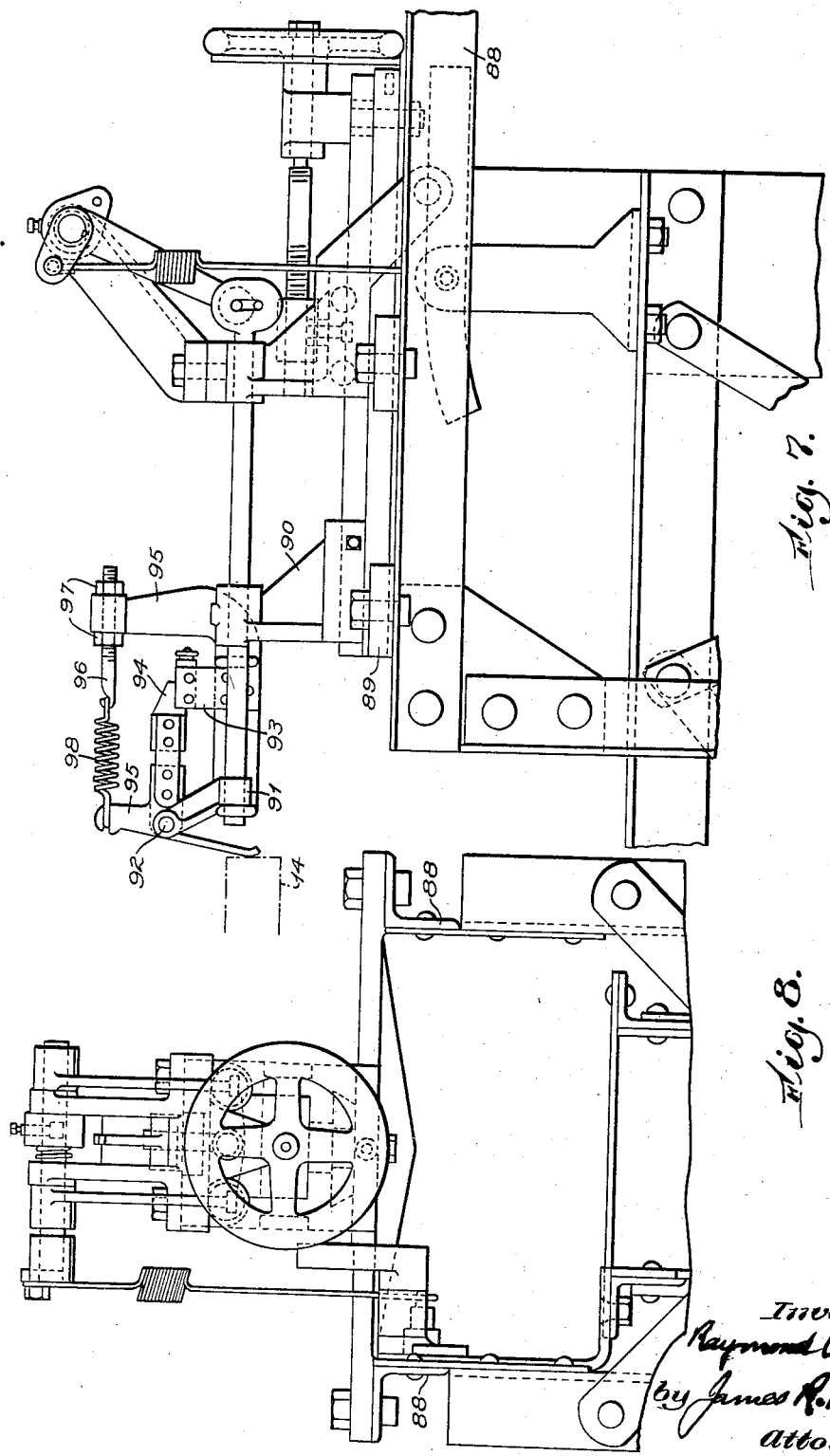

Patented June 2, 1931

1,808,175

UNITED STATES PATENT OFFICE

RAYMOND C. PENFIELD, OF NEW YORK, N. Y.

LIFTING DEVICE

Original application filed May 5, 1926, Serial No. 106,875. Divided and this application filed November 1, 1928. Serial No. 316,546.

My present invention relates to brick making machines, and more particularly to an improved lifting device for use in such machines.

My present invention is a divisional of my application on automatic hacking machines Serial No. 106,875, filed May 5, 1926, and is directed to cover the novel features of the construction and arrangement of parts comprising the lifting device therein illustrated and described.

In a brick making machine such as described and claimed in the application above referred to, and of which the present is a divisional, a slug or plurality of slugs of clay are extruded simultaneously from a slug forming machine and placed on a conveyor. Such a conveyor is described and claimed in detail in my copending application Serial No. 204,795, filed July 11, 1927, and which case is also a divisional of application Serial No. 106,875. The system of conveyors referred to is capable of conjoint use with the improved lifting device of the present application but is not essential thereto and therefore such conveyors have not been illustrated except generally and will not be referred to in detail. It is sufficient to say that the conveyors referred to deliver slugs of clay in succession to a portion of the apparatus forming the present invention and the present apparatus, therefore, operates in synchronism with the delivery end of such conveyor, moving the delivered slugs of clay transversely to the line of travel of the conveyors so as to arrange a plurality of slugs of clay in parallel arrangement with respect to each other.

A portion of the apparatus comprising the present invention consists of carriers for receiving the slugs of clay delivered thereto, which carriers, when filed, are automatically moved into position to have the slugs carried thereby cut up into bricks and it is essential for the proper operation of the brick making machine that a sufficient number of such carriers be provided and proper means be provided for delivering or placing such carriers in succession at the delivery end of the conveyors and removing the same therefrom.

The present invention, therefore, is directed to a lifting device for providing a continuous stream of slug carriers to and in position with respect to the delivery end of the conveyor.

In carrying out my invention I provide a practically rectangular track for the carriers and at each end thereof provide automatically operable elevators for carrying the freshly unloaded carriers from the upper to the lower level and at the other end provide an elevator for moving the unloaded carriers from the lower to the upper level in position to be fed across the path of movement of the slug or slugs. In connection with the carrier operating means is a slug carrying means which is constantly operable and intermittently operable in a vertical direction, such means, when in its upper limit, being in position to receive and transport a slug or slugs across the entire width of the carrier and as it is moved from the upper to the lower position, depositing such slug or slugs on the carrier, and when in its lowermost position being entirely free from the carrier and permitting a lateral movement of the carrier with respect thereto.

An object of my invention, therefore, is an improved means for moving a carrier laterally of an oncoming stream of clay or other material.

Another object of my invention is an improved means for moving a carrier laterally of an oncoming stream of clay by a step-by-step movement.

A still further object of my invention is an improved means for moving a carrier intermittently, the movement of such means being initiated by the oncoming stream of clay.

A still further object of my invention is an improved means for positioning a plurality of carriers in succession in the path of movement of oncoming slugs of clay or other material.

In the accompanying drawings, illustrating the preferred embodiment of my invention:

Fig. 1 is a side elevation;

Fig. 2 is a plan;
Fig. 3 is a rear elevation;
Fig. 4 is an end elevation;
Fig. 5 is a plan view of the portion of Fig. 9 enclosed in the dot and dash line;
Fig. 6 is an enlarged view of the right hand portion of Fig. 4;
Fig. 7 is an enlarged view of a portion of Fig. 1, and
Fig. 8 is an end elevation of Fig. 7.

Referring to the drawings, 10 designates a pit of any suitable dimensions as regards length, breadth and depth. On opposite sides of the pit 10 are erected frame-works 11 of ordinary structural steel and associated with said frameworks so as to be movably vertical therein is a horizontally arranged bridge 12. Means (not shown) is provided for moving such bridge vertically at stated or predetermined periods but as this mechanism forms no part of the present invention, it has not been illustrated and will not be further described. For the full disclosure of the mechanism by means of which the bridge 12 may be moved vertically, attention is directed to the application 106,875, of which the present is a divisional. Supported on the bridge 12 are a pair of parallelly arranged belts 13 which are utilized for carrying slugs of clay 14 from a brick machine and into position in carriers which will be hereinafter described.

At the bottom of the pit 12 and arranged to extend along the length thereof and transversely to the bridge 12 are parallelly arranged pairs of channel irons 14 and secured to each pair of channel irons 14 at various points along the length thereof are bearings 15, such bearings being secured to the base of the pit 10 by bolts 16. The bearings 15 on the channel irons 14 are arranged in groups and are in alinement with each other, and in each group of alined bearings is rotatably mounted a shaft 17 and also secured to each shaft 17 are grooved rollers 18. Such rollers 18 are also arranged in groups, with the rollers of each group in alinement with the other to receive elongated shoes 19 secured to the under side of slug carriers that will be hereinafter described. Each of the shafts 17 have secured thereto sprockets 20 and over such sprockets run endless sprocket chains 21 and by means of which the shafts 17 are rotated in the same direction and at the same speed to thereby impart a uniform surface speed to the periphery of the grooved rollers 18. Associated with one of the shafts 17 by means of a clutch 21 is a shaft 22 rotatably mounted in suitable bearings and having secured at its outer end a sprocket wheel 23. This sprocket wheel 23 is in alinement with a sprocket wheel 24 secured to the stub shaft 25 that is rotatably mounted in suitable bearings on the framework 11. Over the sprocket wheels 23 and 24 runs an endless sprocket chain 26 and by means of which rotative movement is imparted to the plurality of parallelly arranged shafts 17. Also secured to the stub shaft 25 is a sprocket wheel 27 which is in alinement with a sprocket wheel 28 secured to a shaft 29 to be hereinafter referred to. Over the sprocket wheels 27 and 28 runs an endless sprocket chain 30 and by means of which power is transmitted from the shaft 29 to the stub shaft 25.

On either side of the pit 25 and on one side also of the bridge 12 are secured angle braces 32 spaced apart from each other and with corresponding brackets 32 in alinement with each other, and associated with each pair of alined angle braces are channel members 33. Secured to the top of the channel members 33 parallel to each other and extending transversely of the bridge 12 are spaced channel members 34. To the top surface of such channel members 34 are secured by bolts 35 bearing members 36, such bearing members 36 being arranged in groups and with the bearings in each group in alinement with each other and in each group of bearings 36 is rotatably mounted a shaft 37. Secured to said shafts 37 at various points along their length are grooved rollers 38, these rollers being arranged in groups and with the groups in alinement with each other, such grooved pulleys receiving the elongated shoes 19 above referred to. Mounted on a base adjacent to the delivery end of the conveying belts 13 is a base 40 and secured to said base and adjacent one end thereof is a driving motor 41. The driving pinion 42 of such motor meshes with and drives a gear 43 secured to a shaft 44 rotatably mounted in the bearings on the base 40. Also secured to the shaft 44 is a pinion 45 which meshes with and drives a gear 46 secured to a shaft 47 also rotatably mounted in bearings on the base 40 and lying parallel to the shaft 44. Secured to one end of the shaft 47 is a sprocket wheel 48 in alinement with a sprocket wheel 49 on the shaft 25 and over such sprocket runs an endless sprocket chain 50.

The two outermost parallelly arranged shafts 37 or those to the right, as shown in Fig. 5, are provided with alined sprocket wheels 51, over which runs an endless sprocket chain 52 and by means of which said shafts 37 are enabled to run in the same direction and at the same rate of speed, it being understood that the sprocket wheels 51 are of the same diameter and pitch. Secured to the channel members 34 between the two shafts 37 referred to are bearings 53 in which is rotatably mounted a shaft 54 and this shaft has secured thereto spaced gears 55 adapted to engage with racks 56 secured to the bottom surface of the slug carriers to be hereinafter described. Also secured to such shaft 54 is a sprocket wheel 57 which engages with a sprocket chain 52 and acts as a tightening element therefor. The purpose of the gears 55 will appear as the description of the invention progresses. Secured at opposite sides of the pit 10 and to the left of the bridge 12, while spaced apart from each other, are pairs of angle braces 58, such pairs of braces being in line with each other and secured to each pair are channel members 59 which extend, as in the case of the channel members 33, across the pit 10 and parallel to the channel members 33. Secured to the channel members 59 are a plurality of parallelly arranged channel members 60 that extend transversely of such channel members 59 and terminate adjacent to the side of the bridge 12. Secured to the top of the channel members 60 by bolts 61 are bearing members 62, such bearing members being arranged in groups and such groups being in alinement with each other and in each group is rotatably mounted a shaft 63, and on each shaft is secured a plurality of grooved pulleys 64. These pulleys are spaced apart in a manner similar to the grooved rollers 38 above described as being attached to the shafts 37, and like such grooved rollers 38, are adapted to be engaged by the shoes 19 on the slug carriers to be hereinafter described. Several of the shafts 63 are connected together by sprockets and sprocket chains 65 so as to insure that such connected shafts will run at the same speed and in the same direction. Secured to the upper surface of the channel members 60 are bearings 66 in which is rotatably mounted a shaft 67, such shaft carrying, intermediate its ends gears 68 adapted to mesh with the rack 56 on the under surface of the slug carriers to be hereinafter described. The shaft 67 is connected by coupling 69 to a shaft 70 forming part of the mechanism mounted on the base 40, and such shaft 70 is intermittently operated by mechanism that forms no part of the present invention. Reference is hereby made to application Serial No. 106,875, of which the present application is a divisional, for a complete disclosure with regard to the mechanism for operating the shaft 70. The shaft 67 is, therefore, intermittently rotated in the direction of the arrow shown in Fig. 4 and, therefore, periodically moves the slug carrier associated therewith to the right, as viewed in said figure, and transversely of the bridge 12. Secured to one end of one of the shafts 37 is a gear 72 which meshes with and is driven by a gear 73 secured to a shaft 74 that is rotatably mounted in bearings 75 secured to the top of the channel members 33. Also secured to the shaft 74 is a gear 76 which meshes with and is driven by a pinion 77 secured to a shaft 78 rotatably mounted in bearings 79 on a frame 80 suspended from the channel members 33. Also secured to the shaft 78 is a gear 81 which meshes with and is driven by a pinion 82 secured to the drive shaft 33 of a motor or other prime mover 84 mounted on the sub-frame 80. As the slug carriers—to be hereinafter described—are moved to the right of Fig. 5 in the manner above described, they are moved gradually toward the spaced gears 55 and eventually the racks 66 thereon come into engagement with the gears 55. When this occurs, such slug carriers are positively driven to the right, as viewed in Fig. 4 toward mechanism to be hereinafter described. The movement to the right of the slug carriers takes place as referred to above by a step-by-step movement, such movement being initiated by the movement of the slugs of clay 14 themselves. Such action is as follows: Referring to Fig. 1, 88 designates generally a portion of the framework of the machine and mounted on this portion is a base 89, adjacent to one end of which is adjustably mounted a bracket 90. Secured to or formed integral with the bracket 90 is a downwardly extending member 91 in which is secured a laterally extending shaft 92. On the member 91 is secured contactor points 93 and associated with these points is a switch blade 94 secured to arms 95 rotatably mounted on the shaft 92. Also formed integral with the member 91 and extending upwardly therefrom is an arm 95 and slidably mounted in the upper end of this arm is a hook bolt 96, the rear end of which is threaded, and provided on the other side of the arm 95 with adjusting nuts 97 and by means of which the hook bolt 96 relative to the arm 95 may be adjusted. Secured to the forward end of the hook bolt 96 is one end of a coil spring 98, the other end of this coil spring being attached to the upper end of the pivotally mounted member 95. The lower portion of the arm 95 lies in the path of movement of the on-coming slugs of clay 14 and is adapted to be engaged thereby to rotate the member 95 and force the switch blade 94 out of engagement with the contact points 93 against the tension of the spring 98. The switch blade 94 and contact points 93 control the operating circuit for the clutch operating solenoid 98 that is associated with the mechanism illustrated in Fig. 6. This de-energization of the solenoid 98 brings the clutch mechanism 99 and 100 into association with each other and causes a rotation of the shaft 101. Through appropriate mechanism which does not concern the present invention, this will cause, first, a dropping of the bridge 12 and the parts carried thereby downward for a sufficient distance to have the upper face of the endless slug conveyors 13 clear the lower surface of the slug carriers, and afterwards a lateral movement of the slug carrier so as to bring the next two unoccupied spaces into alinement with the endless conveyor belts 13. As soon as the slugs 14 move out of engagement with the lower portion of the member 95, the spring 98 will move the switch blade 94 into engagement with the switch contacts 93, thus again closing the circuit for the solenoid 98 and the parts returned to their normal position.

Arranged above the channel member 34 is a framework 103 on which is mounted a plurality of alined bearings 104 and in these alined bearings is rotatably mounted a shaft 105. Intermediate the ends of the shaft 105 is secured a sprocket wheel 106 over which runs a sprocket chain 107 leading from the motor 108 secured to the frame 103. At various points along the length of the shaft 105 are arranged pivotally mounted carriers 109, at the lower free end of each of which is rotatably mounted a slit saw 110. On the shaft of each of the saws 110 is a sprocket 11 over which runs sprocket chain 112. For each of the sprocket chains 112 there is a sprocket 113 on the shaft 105. The end of each of the pivoted frames 109 at the end remote from the saws 110 are provided with adjustable holding means 113, which adjustable holding means 113 also engage with a portion of the frame 103 and limit the downward movement of the saws 110. When one of the slug carriers engages with the gears 55, such gears 55 will force the slug carrier, together with the slugs of clay thereon, transversely of the saws 110, which, being rotated by the motor 108, which saw the slugs of clay 14 into brick lengths.

Adjacent the saws 110 and in the pit 10 is formed an elevator well 114 and secured to the bottom surface of this well is a vertically arranged hydraulic cylinder 115, and working in this cylinder 115 is a piston 116. The upper end of the piston 116 is connected to the lower face of an elongated rectangular framework 117. Secured to the top surface of the rectangular framework 117 transversely thereof and parallel to each other are pairs of channel irons 118 and to the top of such pairs of channel irons 118 are secured groups of bearings 119. The bearings of each group 119 are in alinement with each other and in each group is rotatably mounted a shaft 120, there thus being a plurality of parallelly arranged shafts 120. The shafts 120 are interconnected together by driving sprocket chains 121 and appropriate sprockets 122 to thereby cause a simultaneous rotation of such shafts 120 in the same direction and at the same rate of speed. Suspended from the rectangular framework 117 is a sub-frame 123 on which is mounted a driving motor 124 and a train of gears designated generally by the reference character 124. Secured to one end of one of the shafts 120 is a gear 125 which meshes with a train of gears 124. Secured to the shafts 120 are grooved rollers 126 and such grooved rollers are arranged in groups, each group being in alinement with each other so as to engage with the shoes 56 on the under surface of the slug carriers. It is obvious that the direction of rotation of the shafts 120 and, therefore, the direction of rotation of the grooved rollers 126 may be varied at will by reversing the connections for the driving motor 124. At each end of the rectangular frame 117 is secured a rectangular framework 128 and which frameworks extend at right angles to the framework 117. On each of the frameworks 128 are arranged pairs of guiding rollers 129, the pairs of guiding rollers 129 being in alinement with each other and defining a passageway in which is guided a slideway 130 on a framework 131 secured to the sides of the pit 10. In the pit 10, at each end thereof, is mounted a bearing 132 and in each bearing is rotatably mounted a shaft 133. At each end of the shaft 133 is secured the lower end of a connecting rod 134, and such connecting rods extend upwardly and have their upper ends pivotally attached to the lower ends of a connecting link 135, such connecting links being pivotally attached at their upper ends to the rectangular frames 128. The shaft 133, the connecting links 134, and 135, constitute an equalizing arrangement for the rectangular frame 117, which insures that such framework 117 will be maintained horizontal at all points during the vertical movement thereof. When the rectangular framework 117 is in its uppermost position, the groups of rollers 118 are in position to receive a slug carrier as it passes under the slitting saws 110, the grooved rollers 118 in this position rotating in a clockwise direction, as viewed in Fig. 5 and the circuit of the motor 124, under these circumstances, being controlled by switch blades 136 and 137 respectively. When a slug carrier, designated generally by the reference character 138, reaches the extreme right hand position, as viewed in Fig. 5, it will engage with a pivoted switch blade 139 and will move the same out of engagement with the switch contact 140. This switching mechanism is in the energizing circuit for the motor 124 and, therefore, the rotation of the switch blade 139 breaks the energizing circuit above referred to, stopping the motor 124 and bringing the loaded slug carrier 138 to rest in the position shown in Fig. 5.

Over one end of the pit 10 is an overhead framework 142, carrying hydraulic cylinders 154. In the cylinders 154 work pistons 155 that have material lifting devices 160 attached to their lower ends. The operator thereupon operates the controlling mechanism for the hydraulic cylinders 154 in such a manner as to lower the brick lifting devices 160 down onto the loaded slug or brick carrier 138 with the brick lifting elements of the brick lifters 160 in position to engage with the individual brick in such carrier. In this downward movement one of the brick lifters 160 engages with the roller 175 rotatably mounted on a link 176. This link, in turn, is pivotally mounted on a shaft 177 on the end of the lever 178. A spring 179 is associated with the link 176 and tends to rotate the same about the shaft 177 in a counter-clockwise direction. A projection on the link 176 is adapted to engage with a pin 180 secured to and extending laterally of the lever 178 and limits the counter-clockwise movement of such link 176. The lever 178 is pivotally mounted at the end remote from the shaft 177 in a bracket 181 secured to any suitable portion of the framework of the machine. Pivotally attached to the lever 178 intermediate its ends and extending downwardly therefrom is a rod 182, the lower end of this rod being slidably mounted in a bearing 183 secured to the framework of the machine. Secured to the rod 182 adjacent to the bearing 183 is a radially extending contact blade 184 that is adapted to engage with a contact blade 185 secured to a bracket 186 on the framework of the machine. In this downward movement, the brick lifter engages with the roller 175 and rotates the link 176 about the shaft 177 as a center in a clockwise direction against the tension of the spring 179 and when the brick lifter has moved downward beyond the roller 175, the spring 179 will rotate the link 176 in a counter-clockwise direction until the projection thereon engages with the pin 180. The operator controls the brick engaging devices of the brick lifters 160 so as to grasp and hold therebetween the individual brick in the slug carriers 138 and then controls the hydraulic cylinder 154 to move the brick lifters 160 upwardly. In this upward movement the upper edge or corner of one of the brick lifters 160 engages with the roller 175 and because the projection on the links 176 engages with the pin 180, the lifters 178 and 176 will be rotated about the pivot point of the lever 178 as a center, lifting the rod 182 and bringing the contact 184 into engagement with the contact 185. These contacts are in a controlling circuit (not shown) for controlling devices that control the operation of the hydraulic cylinder 115. The hydraulic cylinder 115 is controlled to lower the piston 116 therein and the frame 117 thereupon moves downwardly until one of the frame members comes into engagement with the contact 184 and forces the same out of engagement with the contact 185, thus breaking the energizing circuit above referred to and the rectangular frame 117 comes to rest with the grooved rollers 118 thereof in alinement with the grooves wheels or rollers 18. When the rectangular frame 117 starts downward, the contact 139 will rotate into engagement with the contact 140 but this will have no effect at this time on the energizing circuit for the motor 124 because simultaneously with the making of the circuits between the contacts 139 and 140, the contact between the contacts 136 and 137 is broken. When the rectangular frame 117 reaches its lowermost position, the contact 136 moves into engagement with a contact 187 secured to a bracket 188 on the foundation of the machine, completing the energizing circuit for the motor 124 and causing it to rotate its armature in a direction to rotate the grooved rollers 118 in a counter-clockwise direction and moving the now empty slug carrier 138 to the left, as viewed in Fig. 5, and onto the grooved rollers 18. When the empty slug carrier 138 has moved to the left a sufficient distance, the lever 189 is released and the contact carried thereby is separated from contact 190. This causes a controlling movement of the hydraulic cylinder 115 to move the plunger 116 thereof upwardly and carrying the rectangular frame 117 therewith. When the contact 136 becomes separated from the contact 187, the motor 124 is deenergized and the grooved rollers 118 brought to rest. The upward movement of the plunger 116 ceases when the contact 136 engages with the contact 137.

At the end of the pit 10 remote from the well 114 is a well 203, to the bottom of which is secured an hydraulic cylinder 204. Vertically movable in such cylinder there is slidably mounted a vertically arranged piston that has secured to the top thereof a rectangular framework 205 similar in all respects to the rectangular framework 117. On the lower surface of such rectangular framework 205 and at either end thereof are downwardly extending frames 206, provided with spaced pairs of rollers 207 for engaging with guideways 208, attached to the sides of the well 203, and pit 10. On the ends of the pit 203 and at each end thereof are arranged bearing blocks 209 in alinement with each other and in each bearing block is rotatably mounted a shaft 210. Secured to such shaft 210 adjacent the ends thereof are connecting links 211 and the free end of such links are pivotally connected to the lower end of connecting links 212, the other ends of such links 212 being pivotally attached to the downwardly extending frames 206. Secured to the upper surface of the rectangular framework 205 are groups of bearings 213, and in each group of bearings is rotatably mounted a shaft 214 on which, at intervals, are secured grooved rollers 215, such rollers being, therefore, arranged in groups and in alinement with each other so as to form rotatable tracks to receive the downwardly extending shoe 57 attached to the lower surface of the slug carriers 138. When the rectangular frame 205 is in its lowermost position, as shown in Fig. 4, the grooves in the groove rollers 215 are in alinement with the grooves in the grooved rollers 18, shown in Fig. 4, and in the same horizontal plane therewith so that a slug carrier 138 resting on the grooved rollers 18 may be fed to the left of such Fig. 5 and into position on the grooved rollers 215. The grooved rolls 18 constitute a receiving and holding table for the empty slug carrier 138. The right hand end of the shaft 17 shown on Fig. 5 has thereon a sprocket over which runs a sprocket chain 21 leading from the left hand shaft 17, shown in Fig. 4, and the sprocket on the right hand shaft 17 of Fig. 5 is rotatably mounted on such shaft and may be connected so as to rotate therewith by means of a clutch mechanism 216. The operating arm 217 of this clutch mechanism 216 is spring pressed and has connected thereto at the end remote from the clutch mechanism a bell crank lever 218 rotatably mounted on a shaft 219. One arm of this bell crank lever lies in the path of movement of one edge of the rectangular frame 205 and serves, when the rectangular frame is in its lowermost position, to operate the clutch mechanism 217 and connected driving power to the shafts 17 shown in Fig. 5 and, therefore, causes a rotation of the grooved rolls 18 in the direction of the arrow shown in such figure. It will be obvious, therefore, that if at this time a slug carrier 138 is moving to the left, with reference to Fig. 5, on the grooved pulleys or rolls 18 thereon, that such slug carrier will have its march continued until the same is forced onto the grooved rolls 215 carried by the rectangular frame 205, as shown in Fig. 5, and such march will continue until the left hand end of such slug carrier comes into engagement with a contact bar or switch 220, which bar is pivotally mounted on a bracket 221. Secured to such bracket 221 is a switch bar 222 that co-operates with the bar 220 and rotary movement of the bar 220 in a counter clockwise direction will break the connection existing between the bars 220 and 222, thus breaking the energizing circuit for the driving motor for the shafts 17. Secured to the foundation of the machine is a bracket 223 on which is mounted the contact blades 224 adapted to be engaged by a switch blade 225 carried on the rectangular frame 205 and which members 224 and 225 close a circuit for enabling the armature of the motor 226 to rotate in such a direction as to cause a rotation of the grooved pulleys 215 in a counter clockwise direction. Secured to the foundation of the machine at one end of the pit 10 is a panel board 227 and on this board are arranged pivotally mounted control levers 228 and 229 respectively. These levers control the operation of the hydraulic cylinder 204 and are arranged with respect to the controlling valves thereof so that when the lever 228 is in the position shown in Fig. 5, the hydraulic cylinder 204 will be controlled in such a manner as to allow the piston thereof to move downwardly therein and carry the rectangular frame 205 along with it. When both the levers 228 and 229 are in a downward position, the valves for the hydraulic cylinder 204 are so controlled as to cause the piston thereof to move upwardly and this upward movement will continue until both the levers 228 and 229 are in the same relative position with respect to each other as is the lever 229 shown in Fig. 5. Under these conditions the hydraulic cylinder 204 is placed out of operation. Assume that the slug carrier 138 shown in the upper right-hand corner of Fig. 5 has moved gradually to the right until the end thereof moves out of engagement with the lever 229. This lever will immediately rotate in a clockwise direction and assume the same relative position with respect to this point as is shown with respect to the lever 228 and under these conditions the hydraulic cylinder 204 will cause the piston thereof to move upward, carrying the rectangular frame 205 therewith upward until the mechanism has reached the dot and dash line position shown in Fig. 5. As the rectangular frame 205 moves upward and clears the end of the switch bar 220, such switch bar will move into position to engage with the contact 222, thus again closing break point in the operating circuit for the motor 226 and when the rectangular frame is in its uppermost position, the switch blade 225 thereon will engage with a contact bar 230 secured to a bracket 231 mounted on a frame member 232 on the base of the machine and thus completes the energizing circuit for the motor 225, causing the armature thereof to turn in such a direction as to rotate the grooved rollers 215 in a clockwise direction and thus to feed the slug carrier 138 thereon to the right, as shown in Fig. 5. As the rectangular frame 205 approaches its uppermost position, the upper portion of the slug carrier 138 will engage with both of the levers 228 and 229 and will move them into their uppermost position or into the position illustrated by the lever 229, thus stopping the further upward movement of the rectangular frame 205.

As above described, the slug carrier 138 has moved step-by-step or intermittently to the right, as shown in Fig. 5, until the left hand end thereof moves past the delivery belts 13 until the racks 233 on the bottom thereof engage with the gears 55.

The feeding of empty slug carriers 138 into association with the slug delivery belts, the slitting of such slugs into a plurality of bricks, the removal of such plurality of bricks from the slug carriers and the feeding of such empty slug carriers into position to be again filled with slugs becomes an automatic and continuous operation. Assuming that an empty slug carrier is fed off the rectangular frame 205, it is obvious from the above description such empty slug carrier will be moved intermittently step-by-step past the slug delivery belts 13, and when the slug carrier moves off the rectangular framework 205, such framework is automatically lowered into position to receive an empty carrier. The now filled slug carrier is automatically and positively fed under and through the parallelly arranged slitting saws 110 and onto the rectangular framework 117. From such framework the plurality of parallelly arranged bricks are removed and the removal thereof initiates the lowering of the rectangular framework 17 with the now empty slug carrier thereon and when such rectangular framework has reached its lowermost position, the empty slug carrier thereon is automatically moved outward therefrom and the rectangular framework 117 returned to its upper or normal position. The empty slug carrier 138 which has been removed from the rectangular framework 117 moves onto a storage device, where it will remain at rest until the rectangular framework 205 has returned to its lowermost position and the return of such rectangular framework to its lowermost position automatically initiates the removal of the empty slug carrier from the storage device and onto the rectangular framework and with such empty slug carrier in position on the rectangular framework 205, mechanism is automatically operated for elevating the rectangular framework 205 to a point where the cycle of operations may be again started.

While I have necessarily described and illustrated the preferred embodiment of my invention somewhat in detail, it is to be understood that I may vary the size, shape, and arrangement of parts within wide limits without departing from the spirit of the invention.

Having thus described my invention, what I claim as new is:

1. In an automatic brick hacking machine the combination of a vertically movable lift, a plurality of parallelly arranged rollers thereon forming a track, means for rotating said rollers in one direction when the lift is in its uppermost position and for rotating said rollers in the opposite direction when the lift is in its lowermost position.

2. In an automatic brick hacking machine the combination of a vertically movable lift, a plurality of rollers thereon and forming a load supporting track, means for rotating said rollers in either direction, means for moving said lift vertically and means for preventing the rotation of the rollers during the vertical movement of the lift.

3. In a brick hacking machine the combination of a vertically movable lift, a plurality of parallelly arranged rollers thereon and forming a load supporting track, means operating normally when the lift is in its uppermost position for rotating said rollers in one direction, controlling means therefor operable when a load is brought into position on said rollers for stopping the rotation of such rollers and automatic controlling means for starting said operating means to rotate the rollers in the opposite direction when the lift reaches its lowermost position.

4. In a brick hacking machine the combination of a vertically movable lift, means for moving said lift, a plurality of parallelly arranged rollers on said lift and forming a load supporting track therefor, means operating normally when the lift is in its uppermost position for rotating the rollers in one direction, controlling means for said operating means operable when a load is brought into position on said rollers for stopping the rotation of such rollers, controlling devices for the lift operating means operable to cause a downward movement of the lift, automatic controlling means for causing a rotation of the rollers in an opposite direction when the lift reaches its lowermost position and a second controlling device for the lift operating means operable to move the lift upwardly when the load is removed from the rollers.

5. In a brick hacking machine the combination of a vertically movable lift, means for moving said lift, a plurality of parallelly arranged rollers on said lift and forming a load supporting track therefor, means operating normally when the lift is in its uppermost position for rotating the rollers in one direction, controlling means for said operating means operable when a load is brought into position on said rollers for stopping the rotation of such rollers, controlling devices for the lift operating means operable to cause a downward movement of the lift, automatic controlling means for causing a rotation of the rollers in an opposite direction when the lift reaches its lowermost position and a second controlling device for the lift operating means operable to initiate the upward movement of the lift simultaneously with the removal of the load from the rollers.

6. In a brick hacking machine the combination of a pit, parallelly arranged guideways located at each end thereof, a rectangular frame associated with said guideways and movable vertically with respect thereto, a shaft rotatably mounted in said pit, arms secured to said shaft and pivotally attached to said rectangular framework whereby said rectangular framework is maintained horizontal during its upward and downward movement thereof.

7. In a brick hacking machine the combination of a pit, vertically arranged guideways located at either end of said pit, an elongated rectangular framework associated with said guideways and engaging the same during its upward and downward movement, a shaft rotatably mounted in said pit and extending parallel to the longitudinal axis of the rectangular framework, arms secured to the ends of said shaft, said arms having their free ends pivotally attached to the ends of the framework whereby said framework is maintained horizontal during its vertical movement.

In testimony whereof, I have signed my name to this specification.

RAYMOND C. PENFIELD.